July 18, 1967

D. F. GREGG, JR 3,331,494

ARTICLE HOLDING AND SERVING TRAY WITH
DETACHABLE ANCHORING MEANS
Filed Sept. 3, 1965

David F. Gregg, Jr.
INVENTOR.

BY
Attorneys

United States Patent Office 3,331,494
Patented July 18, 1967

3,331,494
ARTICLE HOLDING AND SERVING TRAY WITH DETACHABLE ANCHORING MEANS
David F. Gregg, Jr., P.O. Box 84,
Fair Bluff, N.C. 28439
Filed Sept. 3, 1965, Ser. No. 484,833
3 Claims. (Cl. 206—19.5)

ABSTRACT OF THE DISCLOSURE

The disclosed invention is designed and adapted for use when perched in a usable position atop the crown portion of a tunnel-hump in an automobile. It is characterized by an elongated tray embodying a depending rim-like skirt having longitudinal side walls. Weighted tray positioning and holddown bags with upwardly inwardly disposed longitudinal edge portions are provided with stick holding hems which are detachably and adjustably connected with median slotted portions of the side walls.

---

The present invention relates to a multipurpose small article holding an occupant serving tray which is functionally designed and structurally adapted to be removably perched atop the convex crown portion of a tunnel-hump in an automobile and which is provided with novel and improved holddown and anchoring means.

Small article storing containers, trays and the like having the capability of convenience and usefulness atop the usual tunnel-hump in automobiles involves a practice which is old and well-known. The article receptacle for automobiles shown in the Allen Patent 3,002,665 is one example. The automobile service bar revealed in Patent 3,136,361 is another example which may be regarded as further indicative of the field of invention under advisement. An objective in the instant matter is to improve upon the prior patents just referred to but, more particularly, upon a somewhat more analogous adaptation, namely, the refuse container for use in automobiles, covered in Larkin's Patent 3,109,537.

A studied analysis of the aforementioned prior reference patents and a comparison thereof with each other and with the invention herein disclosed will show that significant differences have to do with the means and devices which have been devised to orient the receptacle tray with the crest or crown of the tunnel-hump to permit ready application and removal, to make for access and convenience to the stored ready-to-use articles while the automobile is in motion or temporarily parked by the roadside or a picnic area as the case may be.

With the above general picture in mind it will be evident by merely glancing at the views of the accompanying drawings that the advance in the art herein under advisement has to do with a small article receiving, holding and occupant serving tray equipped with facilities giving it the desired capability of occupying a stay-put position atop the aforementioned tunnel-hump.

More specifically, novelty is predicated on holddown and anchoring weights, simple sand loaded or equivalent canvas bags which are not only detachably connected with the median portions of the side walls of the tray but are balanced and shaped and arranged so that they drape down over diametrically opposite sides of the hump and properly locate and orient the tray in an in-between position on the hump.

In carrying out a preferred embodiment of the invention the opposed longitudinal side walls of the rim-like skirt of the tray are provided with slots. These slots serve to permit hem-equipped end portions of the sand bags or sacks to be threaded therethrough in order to accommodate insertable and removable rounds, dowels or simple sticks which constitute satisfactory retaining elements.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
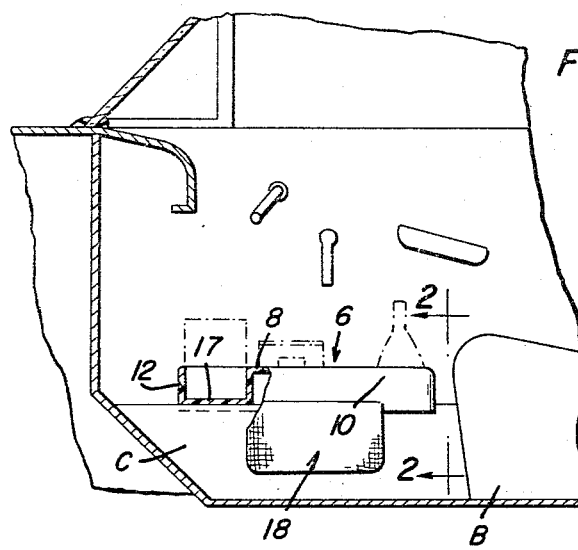
FIG. 1 is a fragmentary view with parts in section and elevation showing an automobile, more particularly, the forward portions thereof, the aforementioned tunnel-hump, the improved article holding and serving tray partly in section and elevation, and at least one of the weighted holddown-type weights or bags.
Figure 2:
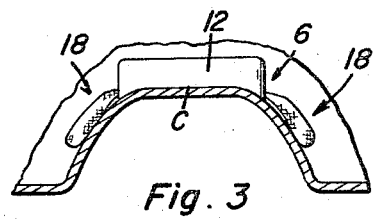
FIG. 2 is a section taken on the plane of the vertical section line 2—2 of FIG. 1.
Figure 3:
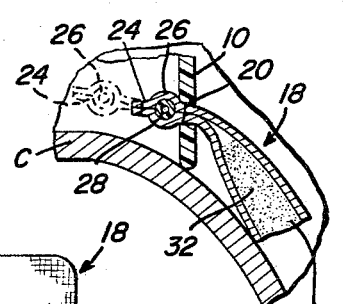
FIG. 3 is a fragmentary detail sectional view taken approximately on the plane of the section line 3—3 of FIG. 4.

Referring now to the views of the drawings and first to FIGS. 1, 2 and 3 it will be seen that the letter A designates an automobile or equivalent motor vehicle and which, as is generally the case, is provided on its floor B with the aforementioned generally semi-circular tunnel-hump C.

The tray 6 is preferably constructed of moldable colorful plastic material and is generally rectangular in plan and has a substantially flatwise top wall 8 and a depending skirtlike marginal rim characterized by opposite longitudinal side walls or flanges 10 and transverse end walls 12. The top wall is provided with a plurality of selectively usuable integral well-like compenents which constitute and provide selectively usable receivers 13, 14, 15, 16 and 17 for various insertable and removable small articles as suggested in phantom lines in FIG. 1. It should be noted that the bottom portions of all of these receivers or receptacles are substantially coplanar and terminate in a plane above the plane of the open bottom. The forward and rear end walls are suitably curved along their lower edge portion to fittingly reside atop the crest of crown of the tunnel hump C. The opposed companion holddown and weighting anchors are denoted at 18 and 19 respectively. The construction and arrangement in each instance is the same and the description of one will suffice for both. To the ends desired each longitudinal side wall 20 is provided midway between its transverse ends with a horizontally elongated slot.

Figure 4:
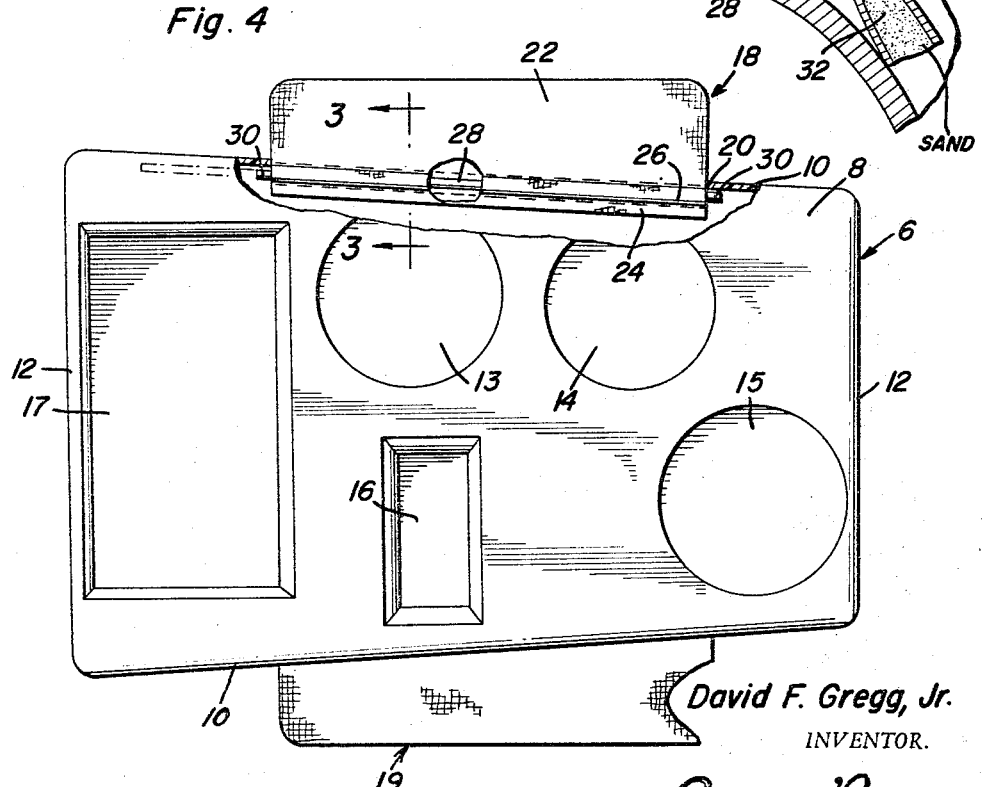
FIG. 4 is an enlarged top plan view showing the tray, both of the holddown weights or sand bags and with one side wall and adjacent top portion broken away to illustrate the improvements which are particularly featured in the instant matter.

Each holddown weight or anchor comprises a generally rectangular or elongated bag 22 made of canvas or an equivalent material. Each bag is of a length commensurate with the length of the slot 20 and is adapted to be detachably and adjustably connected with the wall 10 by way of the slot. The bag has an inner attachable lengthwise edge portion 24 which is passed through the slot and is provided adjacent said edge with an open-ended pocket or hem 26. This hem serves to accommodate an insertable and removable dowel, rod or pin 28. In practice a simple resilient plastic stick has been used. It is inserted by way of the open ends of the hem and is of a length greater than the hem with the end portions 30 projecting beyond the respective ends of the slot 20. The receptacle portion of the bag is filled with sand or equivalent weight media 32 as shown in FIG. 3. FIG. 3 also shows how the hem-equipped edge portion components 24 and 26 can be hand pulled through the slot inwardly into the hollow portion of the tray to permit one to insert and remove the retaining rod by simply slipping it endwise as suggested in dotted lines in FIG. 4 and then angling it out whereby to permit the bag to be pulled in a reverse direction that is from left to right in FIG. 3 and the edge portion withdrawn through the slot. With this construction and arrangement it is possible to use bags of different sizes and weights depending on the particular purposes for which the tray is usable, that is, depending largely on the cross-sectional dimension of the tunnel-hump as it exists in varying makes of automobiles.

Experience has repeatedly shown that this one-piece molded plastic lightweight but durable occupant serving tray is unique, is regarded as an innovation, is structurally and functionally original and well serves the purposes for which it is intended. As to the matter of attaching and detaching the sand bags and the mode of using the bag equipped tray it is believed that this aspect of the concept will be clear from the views of the drawing taken in conjunction with the description of the details. Accordingly, a more extended description is thought to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A multipurpose small article holding and occupant serving tray for use atop the crown portion of a tunnel-hump in an automobile, said tray having a top wall provided with a plurality of selectively usable depending receivers constituting article holders, and having a marginal depending skirt-like rim, said rim having longitudinal side walls joined by intervening transverse end walls, the median portion of each side wall having a slot, a sand containing bag constituting a weighting and holddown device, said bag having its inward lengthwise edge portion extending slidingly and removably through a coacting slot, said edge portion being provided with an open-ended hem, and an insertable and removable rod fitted in said hem and having end portions projecting beyond the respective ends of the hem and adapted to engage interior side surfaces of the cooperating side wall in a manner to removably hold the hem-equipped edge of the bag in place.

2. The structure defined in and according to claim 1 and wherein said tray is formed in one piece from moldable plastic material, said tray being open at its bottom and the bottom portion of all of the holders therein terminating in a common plane, the plane being above the plane of the lower edges of said side walls, certain of said holders being well spaced from interior surfaces of said side walls to provide clearance spaces for the hems and rods and to facilitate the step of permitting ready access to be had to the hems and rods, said rods being of a length appreciably less than the length of the respectively cooperating side walls.

3. A multipurpose small article holding and occupant serving tray for readily applicable and removable use atop the crown portion of a tunnel-hump in an automobile, said tray having a top wall and a marginal depending skirt-like rim embodying opposed spaced parallel longitudinal side walls, the median portion of each side wall having an elongated slot spaced above and parallel to the bottom edge of the coacting side wall, a sand containing bag constituting a weighting and holddown device for each side wall, each sand bag having an inward lengthwise edge portion extending slidingly and removably through the coacting slot, said edge portion being provided with an open-ended hem, and an insertable and removable bag attaching and retaining rod fitted in said hem, said rod being of a length greater than the length of the hem and having its respective end portions projecting beyond the respective ends of the hem in a manner to abut interior side surfaces of the cooperating side wall at the respectively cooperable ends of the slot.

References Cited

UNITED STATES PATENTS

| | | | |
|---|---|---|---|
| 2,224,161 | 12/1940 | Rice | 24—86 |
| 3,109,537 | 11/1963 | Larkin | 206—19.5 |
| 3,110,397 | 11/1963 | Peck et al. | 206—19.5 |

ROY D. FRAZIER, *Primary Examiner.*

F. DOMOTOR, *Assistant Examiner.*